(12) United States Patent
Kuznetsova et al.

(10) Patent No.: US 9,805,264 B2
(45) Date of Patent: Oct. 31, 2017

(54) INCREMENTAL LEARNING FRAMEWORK FOR OBJECT DETECTION IN VIDEOS

(71) Applicant: Disney Enterprises, Inc., Burbank, CA (US)

(72) Inventors: Alina Kuznetsova, Hannover (DE); Sung Ju Hwang, Ulsan (KR); Leonid Sigal, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 22 days.

(21) Appl. No.: 14/887,141

(22) Filed: Oct. 19, 2015

(65) Prior Publication Data

US 2017/0109582 A1    Apr. 20, 2017

(51) Int. Cl.
*G06K 9/00* (2006.01)
*G06K 9/46* (2006.01)

(52) U.S. Cl.
CPC ........ *G06K 9/00711* (2013.01); *G06K 9/4671* (2013.01)

(58) Field of Classification Search
None
See application file for complete search history.

(56) References Cited

U.S. PATENT DOCUMENTS

| | | | | |
|---|---|---|---|---|
| 5,341,142 A * | 8/1994 | Reis | ...................... | F41G 7/2226 244/3.15 |
| 8,400,619 B1 * | 3/2013 | Bachrach | ................. | G01C 1/04 356/4.01 |
| 2008/0273800 A1 * | 11/2008 | Hatabu | ................ | G06K 9/6203 382/209 |
| 2009/0141940 A1 * | 6/2009 | Zhao | .................. | G06K 9/00295 382/103 |
| 2011/0081081 A1 * | 4/2011 | Smith | ................ | G06K 9/00818 382/170 |
| 2014/0363044 A1 * | 12/2014 | Williams | ........... | G06K 7/10722 382/103 |

OTHER PUBLICATIONS

Hwang et al, "Analogy-preserving Semantic Embedding for Visual Object Categorization", Proceedings of the 30th International Conference on Machine Learning, Atlanta, Georgia, USA, 2013. JMLR: W&CP vol. 28.*

(Continued)

*Primary Examiner* — Shervin Nakhjavan
(74) *Attorney, Agent, or Firm* — Patterson + Sheridan, LLP (57) ABSTRACT

Techniques disclose an incrementally expanding object detection model. An object detection tool identifies, based on an object detection model, one or more objects in a sequence of video frames. The object detection model provides an object space including a plurality of object classes. Each object class includes one or more prototypes. Each object is classified as being an instance of one of the object classes. Each identified object is tracked across at least one of the frames. The object detection tool generates a measure of confidence for that object based on the tracking. Upon determining that the measure of confidence exceeds a threshold, the object detection tool adds a prototype of the instance to the object detection model.

20 Claims, 6 Drawing Sheets

(56) References Cited

OTHER PUBLICATIONS

Aytar et al., "Tabula Rasa: Model Transfer for Object Categeory Detection", ICCV '11 Proceedings of the 2011 International Conference on Computer Vision, pp. 2252-2259, Washington DC, USA.
Bengio et al., "Label Embedding Trees for Large Multi-Class Tasks", Advances in Neural Information Processing Systems 23, 2010, pp. 163-171.
Carlson et al., "Toward an Architecture for Never-Ending Language Learning", AAAI Conference on Artificial Intelligence, Nov. 12, 2010.
Chen et al., "NEIL: Extracting Visual Knowledge from Web Data", IEEE International Conference on Computer Vision (ICCV), 2013, pp. 1409-1416.
Donahue et al., "Semi-Supervised Domain Adaptation with Instance Constraints", IEEE Conference on Computer Vision and Pattern Recognition (CPVR), Jun. 23-28, 2013, pp. 668-675, Portland, Oregon.
Fernando et al., "Unsupervised Visual Domain Adaptation Using Subspace Alignment", 2013 IEEE International Conference on Computer Vision (ICCV), Dec. 1-8, 2013, pp. 2960-2967, Sydney NSW.
Gong et al., "Geodesic Flow Kernel for Unsupervised Domain Adaptation", IEEE Conference on Computer Vision and Pattern Recognition (CVPR), Jun. 16-21, 2012, pp. 2066-2073, Providence, RI.
Gopalan et al., "Domain Adaptation for Object Recognition: An Unsupervised Approach", 2011 IEEE International Conference on Computer Vision, Nov. 6-13, 2011, pp. 999-1006, Barcelona, Spain.
Hoffman et al., "Discovering Latent Domains for Multisource Domain Adaptation", Computer Vision—ECCV 2012, pp. 702-715, Springer Berlin Heidelberg.
Kulis et al., "What You Saw is Not What You Get: Domain Adaptation Using Asymmetric Kernel Transforms", CVPR '11 Proceedings of the 2011 IEEE Conference on Computer Vision and Pattern Recognition, pp. 1785-1792. IEEE Computer Society, Washington DC, USA.
Kumar et al., "Self-Paced Learning for Latent Variable Models", Proceedings of Advances in Neural Information Processing Systems (NIPS), 2010, pp. 1189-1197.
Lee et al., "Learning the Easy Things First: Self-Paced Visual Category Discovery", 2011 IEEE Conference on Computer Vision and Pattern Recognition (CVPR), Jun. 20-25, 2011, pp. 1721-1728. Providence, Rhode Island.
Mensink et al., "Distance-Based Image Classification: Generalizing to new classes at near-zero cost", IEEE Transactions on Pattern Analysis and Machine Intelligence, Institute of Electrical and Electronics Engineers, 2013, pp. 2624-2637.
Prest et al., "Learning Object Class Detectors from Weakly Annotated Video", CVPR 2012—Conference on Computer Vision and Pattern Recognition, Jun. 2012, pp. 3282-3289, Providence, Rhode Island.
Saenko et al., "Adapting Visual Category Models to New Domains", ECCV '10 Proceedings of the 11th European Conference on Computer Vision: Part IV, 2010, pp. 213-226, Springer-Verlag Berlin Heidelberg.
Sharma et al., "Efficient Detector Adaptation for Objection Detection in a Video", Computer Vision and Patteron Recognition (CVPR), IEEE 2013.
Tang et al., "Shifting Weights: Adapting Object Detectors from Image to Video", Advances in Neural Information Processing Systems, 2012, pp. 647-655.
Thrun, Sebastian, "A Lifelong Learning Perspective for Mobile Robot Control", Proceedings of the IEEE/RSJ/GI Conference on Intelligent Robots and Systems, Sep. 12-16, 1994, vol. 1 pp. 23-30. Munich, Germany.

Deng et al., "ImageNet: A Large-Scale Hierarchical Image Database", IEEE Conference on Computer Vision and Pattern Recognition, Jun. 20-25, 2009, pp. 248-255. Miami, Florida.
Felzenszwalb et al., "Object Detection with Discriminatively Trained Part Based Models", IEEE Transactions on Pattern Analysis and Machine Intelligence, Sep. 22, 2009, pp. 1627-1645.
Fu et al., "Transductive Multi-view Embedding for Zero-Shot Recognition and Annotation", Computer Vision—ECCV 2014: 13th European Conference Zurich, pp. 584-599.
Gaidon et al, "Self-Learning Camera: Autonomous Adaption of Object Detectors to Unlabeled Video Streams", Arxiv.org, 2014.
Hoai et al., "Discriminative Sub-categorization", 2013 IEEE Conference on Computer Vision and Pattern Recognition, Jun. 23-28, 2013, pp. 1666-1673, Portland, Oregon.
Hoffman et al., "Continuous Manifold Based Adaptation for Evolving Visual Domains", 2014 IEEE Conference on Computer Vision and Pattern Recognition (CVPR), Jun. 23-28, 2014, pp. 867-874, Columbus, Ohio.
Jia et al., "Caffe: Convolutional Architecture for Fast Feature Embedding", Proceedings of the ACM International Conference on Multimedia, 2014, pp. 675-678.
Khosla et al., "Undoing the Damage of Dataset Bias", ECCV '12 Proceedings of the 12th European Conference on Computer Vision, 2012, vol. Part I, pp. 158-171.
Lucas et al., "An Iterative Image Registration Technique with an Application to Stereo Vision", IJCAI '81 Proceedings of the 7th International Joint Conference on Artificial Intelligence, 1981, vol. 2, pp. 674-679, Morgan Kaufmann Publishers, Inc., San Francisco, California.
Pirsiavash et al., "Detecting Activities of Daily Living in First-person Camera Views", 2012 IEEE Conference on Computer Vision and Pattern Recognition, Jun. 16-21, 2012, pp. 2847-2854, Providence, Rhode Island.
Sharma et al., "Unsupervised Incremental Learning for Improved Object Detection in a Video", 2012 IEEE Conference on Computer Vision and Pattern Recognition (CVPR), Jun. 16-21, 2012, pp. 3298-3305, Providence, Rhode Island.
Silver et al., "Lifelong Machine Learning Systems: Beyond Learning Algorithms", 2013 AAAI Spring Symposium, Mar. 25-27, 2013, Stanford University.
Tomasi et al., "Detection and Tracking of Point Features", International Journal of Computer Vision, Apr. 1991.
"Expanding Object Detector's Horizon: Incremental Learning Framework for Object Detection in Videos;" Alina Kuznetsova, Sung Ju Hwang, Bodo Rosenhahn, Leonid Sigal; The IEEE Conference on Computer Vision and Pattern Recognition (CVPR; Jun. 2015; pp. 28-36.
"ImageNet: A Large-Scale Hierarchical Image Database;" Jia Deng, Wei Dong, Richard Socher, Li-Jia Li, Kai Li and Li Fei-Fei; Dept. of Computer Science Princeton University, USA pp. 1-8.
Wang et al.; "Detection by Detections: Non-Parametric Detector Adaptation for a Video;" In Computer Vision and Pattern Recognition (CVPR); IEEE Conference on pp. 350-357; Jun. 2012.
Weinberger et al.; "Large Margin Taxonomy embedding for document categorization;" In D. Koller, D. Schuurmans, Y Bengio, and L. Bottou, editors, Advances in Neural Information Processing System (NIPS), pp. 1737-1744; 2009.
Weston et al.; "WSABIE: Scaling Up to Large Vocabulary Image Annotation;" 1 Google, USA; 2 Universite Paris 6, LIP6, France; 2011.
Yamada et al.; "Domain adaptation for structured regression;" In IJCV; 2014.
Sharma et al.; "Efficient Detector Adaptation for Object Detection in a Video;" Institute for Robotics and Intelligent Systems, University of Souther California; Los Angeles, CA 90089, USA; 2013.
Torralba et al.; "Ubiased Look at Dataset Bias;" In Computer Vision and Pattern Recognition (CVPR); pp. 1521-1528; 2011.
Uijlings et al.; "Selective Search for Object Recognition;" University of Trento, Italy; Technical Report 2012, submitted to IJCV, 104(2):154-171, 2013.

* cited by examiner

INCREMENTAL LEARNING FRAMEWORK FOR OBJECT DETECTION IN VIDEOS

BACKGROUND

Field

Embodiments of the present invention generally relate to object detection in images and videos, and more specifically, to a framework for incrementally expanding the object detector in such a way as to allow better detection from image instances that are substantially different from instances seen during initial training of the detector.

Description of the Related Art

Traditional image-based object detection systems identify objects in a video using a model trained on a source domain of images. Doing so allows the detection system to, e.g., localize an object and determine its bounding box for further use. The image-based model also allows the object detection system to distinguish object from one another and to classify objects into predefined types. However, systems that use image-based detection models often fail to generalize examples falling in a source (training) domain of images to the target (test) domain of videos. An object detection system trained on one set of image data often fails to accurately detect objects of other data sets.

To address this issue, some image-based object detection systems perform domain adaptation. An example domain adaptation approach involves transferring learned information (e.g., labeled sample images) from the source domain to the target domain. However, a target domain of objects (e.g., in videos) may constantly evolve object appearance and lighting changes. Further, as the object detection system adapts to a new target domain, the system disregards information learned from the previous target domain. Thus, if given the previous target domain, the object detection system has to again adapt to that domain.

SUMMARY

One embodiment presented herein discloses a method. The method generally includes identifying, based on an object detection model, one or more objects in a first sequence of video frames of a plurality of sequences of video frames. The object detection model provides an object space including a plurality of object classes. Each object class is represented by one or more prototypes. Each object is classified as being an instance of one of the object classes. For each object, the following generally occurs. The object is tracked across at least one of the frames. A measure of confidence for the object is generated based on the tracking. The measure of confidence indicates a degree that the object does not correspond to any of the one or more prototypes currently associated with the object class. Upon determining that the measure of confidence exceeds a threshold, a prototype representative of the instance is added to the object detection model.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein disclose a framework for incrementally expanding a training model in an object detection system. In one embodiment, the object detection system is configured with a predefined training model. The training model may be constructed from a data set of labeled images, i.e., images that includes one or more objects classified to a given object class (e.g., a "cup," a "human," a "television," etc.). The model consists of one or more prototypes. The object detection system receives one or more videos. For a given video, the system detects object instances and tracks the instances through the video.

In one embodiment, the object detection system may score each track based on a measure of confidence that the track corresponds to an instance of a given object class. Further, the object detection system expands the model using tracked instances observed in each video with a measure of confidence that exceeds a specified threshold. Further still, the object detection system continues this approach as additional videos are received. As a result, the complexity of the model increases as each additional video is processed and new prototypes are identified for an object class based on the confidence measure.

Advantageously, the complexity of the object detection model is continuously adjusted to the additional videos such that, over time, performance of the object detection system is improved over various source domains, including the original video domain. Thus, even if the current video domain continues to evolve as the object detection system processes new videos, the object detection system nevertheless maintains accuracy in detecting videos in the original domain.

Figure 1:
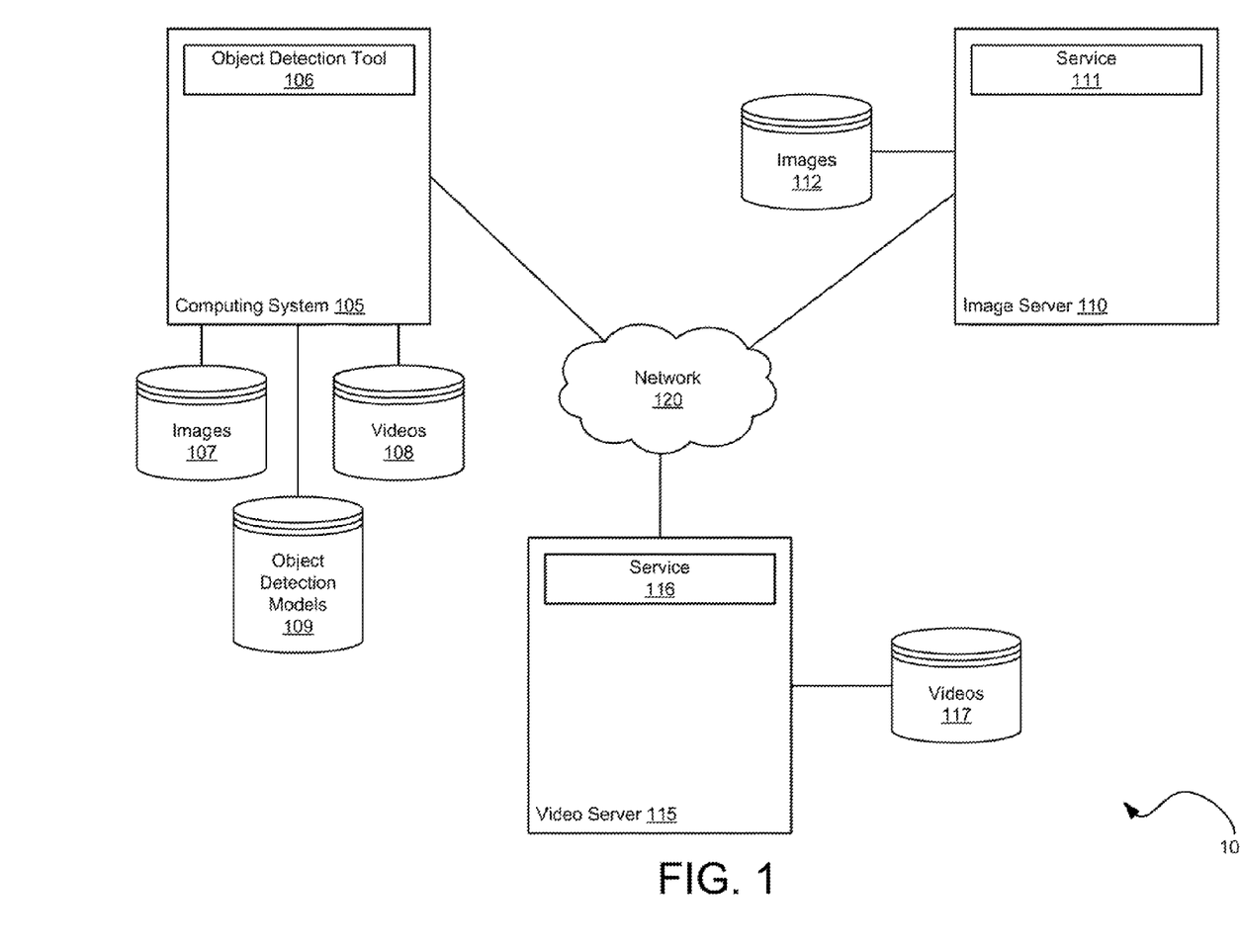
FIG. 1 illustrates an example computing environment, according to one embodiment.

FIG. 1 illustrates an example computing environment 100, according to one embodiment. As shown, the computing environment 100 includes a computing system 105, an image server 110, a video server 115, and a network 120. The computing system 105, image server 110, and video server 115 may be interconnected with one another via the network 120. The computing system 105, image server 110, and the video server 115 may be a physical computing system or a virtual machine instance (e.g., executing in a cloud network).

In one embodiment, the computing system 105 includes an object detection tool 106, one or more images 107, one or more videos 108, and object detection models 109. The object detection tool 106 receives the images 107 from a variety of sources, such as from a public image service 111 executing on the image server 111, which makes images 112 available for download. The images 107 may be labeled for the purpose of object detection. That is, the images 107 may contain metadata describing the image. For example, a label may describe a given image 107 as corresponding to a vehicle, table, television, etc.

Further, the object detection tool 106 receives the videos 108 from a variety of sources, such as from a service 111 (executing on the video server 115), which provides videos 117. The object detection tool 106 evaluates frames of each video 108 based on an object detection model 109. In one embodiment, the detection model 109 is a large-margin embedding (LME) model that is built based on the labeled images 107. As known, LME models are multi-classification that learns to embed labels in a low-dimensional space using little to no data.

An initial object detection model 109 provides a number of object classes, where each object class is modeled by a prototype in the low-dimensional embedding space. The object detection tool 106 identifies object instances in a video frame using a nearest-neighbor distance between a projected test instance and the object class prototypes. The object detection tool 106 may surround each instance with a bounding box.

As described below, the object detection tool 106 observes object tracks. For example, the object detection tool 106 may track an object through a series of video frames, such as a television, as the view of the camera changes. Doing so allows the object detection tool 106 to gather image statistics of the television object at different perspectives, such as a frontal view, side view, and rear view of the television. Further, the object detection tool 106 extracts object tracks associated with object instances having a relatively high measure of confidence. If the instances of such tracks form a cluster in the embedding space that is in vicinity of, but not sufficiently covered by, the prototype of the corresponding object class in the detection model 109, then the object detection tool 106 initializes a new prototype based on the track instances.

The object detection tool 106 continues to extract confident instances and expand the detection model 109 with each additional video 108 received. As a result, over time, the complexity of the detection model 109 grows, where the number of prototypes per object class is mitigated by a variance of instances within each object class. Further, over time, the prototypes form a coherent manifold within a learned embedding space.

Figure 2:
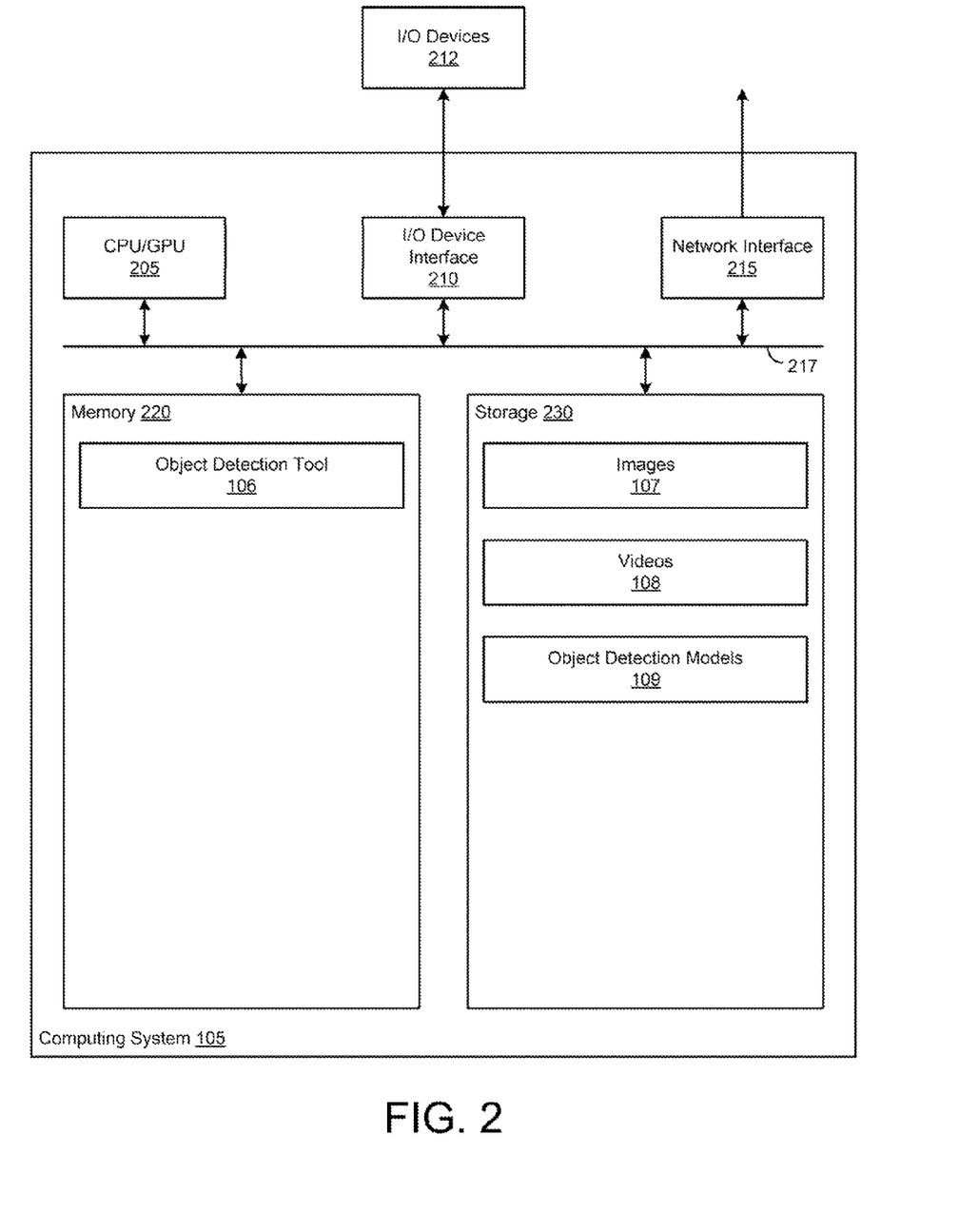
FIG. 2 further illustrates the computing system described relative to FIG. 1, according to one embodiment.

FIG. 2 further illustrates the computing system 105, according to one embodiment. As shown, the computing system 105 further includes, without limitation, a central processing unit/graphics processing unit (CPU/GPU) 205, a network interface 215, a memory 220, and storage 230, each connected to a bus 217. The computing system 105 may also include an I/O device interface 210 connecting I/O devices 212 (e.g., keyboard, display and mouse devices) to the computing system 105. Further, in context of this disclosure, the computing elements shown in the computing system 105 may correspond to a physical computing system (e.g., a system in a data center) or may be a virtual computing instance executing within a computing cloud.

CPU/GPU 205 retrieves and executes programming instructions stored in memory 220 as well as stores and retrieves application data residing in the storage 230. The bus 217 is used to transmit programming instructions and application data between CPU 205, I/O devices interface 210, storage 230, network interface 215, and memory 220. Note, CPU 205 is included to be representative of a single CPU, multiple CPUs, a single CPU having multiple processing cores, and the like. Memory 220 is generally included to be representative of a random access memory. Storage 230 may be a disk drive storage device. Although shown as a single unit, storage 230 may be a combination of fixed and/or removable storage devices, such as fixed disc drives, removable memory cards, or optical storage, network attached storage (NAS), or a storage area-network (SAN).

Illustratively, memory 220 includes the object detection tool 106. And storage 230 includes the images 107, videos 108, and object detection models 109. As stated, the object detection tool 106 identifies and tracks object instances in frames of the videos 108 based on an object detection model 109. The object detection tool 106 extracts tracks from the video having a relatively high measure of confidence. In addition, the object detection tool 106 updates the object detection model 109 based on the extracted tracks.

As stated, the object detection model 109 may be built based on large-margin embedding (LME) techniques. LME projects samples into low-dimensional space such that object instances that belong to different classes are separated with respect to some similarity/dissimilarity measure. As a result, LME-based models are relatively flexible and scalable. The object detection model 109 is built from a set training data, such as the images 107, which can be represented as:

$$\mathcal{D}_j = \{x_i, y_i\}_{i=1}^{N_J} \quad (1),$$

where $N_J$ represents a number of labeled instances, where $x_i \in \mathbb{R}^D$ is a D-dimensional feature descriptor of an image patch containing an object and $y_i \in \{1, \ldots, C\}$ is an object label. The object detection model 109 learns a linear low-dimensional embedding defined by a projection matrix:

$$W \in \mathbb{R}^{d \times D} (d << D) \quad (2),$$

and also defined by, in the embedding space, one or more class prototypes:

$$u_c \in \mathbb{R}^d, c = \{1 \ldots C\} \quad (3),$$

such that a sample projected into the low-dimensional space is closer to a correct class prototype than to prototypes of other classes. The below represents a similarity measure between a projected feature vector $z_i = W x_i$ and a prototype $u_c$:

$$d(z_i, u_c) \quad (4).$$

Learning of the linear low-dimensional embedding can be encoded by a positive margin between similarity of $z_i$ and its original prototype and all other prototypes:

$$d(z_i, u_{y_i}) + \xi_{ic} \geq d(z_i, u_c) + 1,$$

$$i = \{1 \ldots N\}, c = \{1 \ldots C\}, c \neq y_i, \quad (5)$$

where $\xi_{ic}$ are slack variables to be minimized. Learning of an optimal W and $\{u^1 \ldots u^C\}$ can be represented as a minimization of:

$$\Sigma_{i,c:c \neq y_i} \max(\xi_{ic}, 0) + \frac{1}{2}\lambda\|W\|_{FRO}^2 + \frac{1}{2}\gamma\|U\|_{FRO}^2, \quad (6)$$

where U is the column-wise concatenation of prototypes $u^C$, and $\lambda$ and $\gamma$ are weights of regularizers. A label of a new sample x* during a test phase may then be determined by comparing the similarity of the new sample to prototypes in the embedding space:

$$y^* = \mathrm{argmax}_c d(z^*, u_c) = \mathrm{argmax}_c d(Wx^*, u_c) \quad (7).$$

Further, the object detection model 109 may measure similarity in the embedding space using a scalar product:

$$d(z_i, u_c) = d_w(x_i, u_c) = \langle W_{x_i}, u_c \rangle \quad (8)$$

The object detection tool 106 designates the initial object detection model 109 for classifying objects. In one embodiment, the object detection tool 106 may extend LME formulation in the object detection model 109 for object detection and identify multiple prototypes for object classes.

Further, the object detection model includes a non-object class. The non-object class is defined as a foreground patch within a frame that does not contain an object of interest if the patch is sufficiently dissimilar to all currently known object class prototypes, assuming that such a negative space is larger to embed negative samples in. This may be expressed as a set of additional large-margin constraints in optimization:

$$d_w(x_j^0, u_c) \leq 1 + \xi_j^0, c = \{1, \ldots, C\}, \xi_j^0 \geq 0 \quad (9),$$

where $x_j^0$, $j=\{1, \ldots, N_j\}$ are patches that do not contain any object of classes $\{1, \ldots, C\}$. $\xi_j^0$ represents a positive slack variable.

Figure 3:
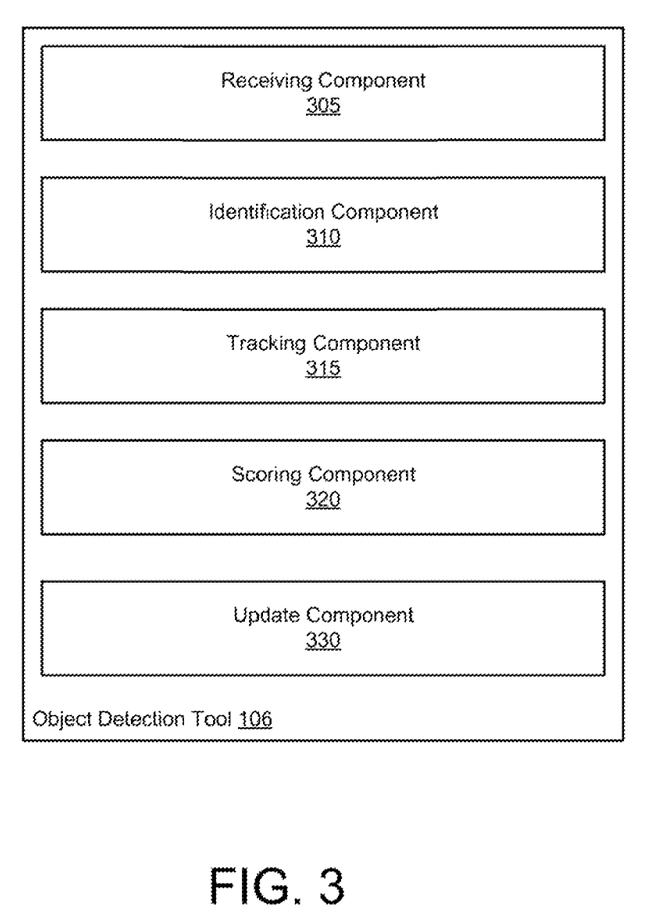
FIG. 3 further illustrates the object detection tool described relative to FIGS. 1 and 2, according to one embodiment.

FIG. 3 further illustrates the object detection tool 106, according to one embodiment. As shown, the object detection tool 106 further includes a receiving component 305, an identification component 310, a tracking component 315, a scoring component 320, and an update component 330. The receiving component 305 receives videos 108 as input.

In one embodiment, the identification component 310 detects objects in frames of a given video 108. To do so, the identification component 310 obtains object proposals $\{b_i\}_{i=1}^{N_v}$, e.g., using selective search techniques and corresponding feature vectors $\{x_i\}_{i=1}^{N_v}$. The identification component 310 evaluates each feature vector $x_i$ to obtain a probability score for each proposal. The identification component 310 obtains, based on the probability scores, a set of detected objects $\mathcal{D}_v = \{x_i, c_i, p(y=c_i, d=1|x_i)\}_{i=1}^{D_v}$ by selecting the object proposal i, such that $p(y=c_i, d=1|x_i) > v$, where v is some threshold. The identification component 310 may identify an optimal value of v via cross-validation, but in practice, $v=0.5$ has been shown to be effective. The object detection tool 106 may use the obtained set of detected objects $D_v$ as new training samples to train a new category prototype.

In one embodiment, the tracking component 315 observes a detected object from frame-to-frame. That is, if an object is detected in one frame, that object is likely to persist for a number of frames at a relatively similar position and scale. The tracking component 315 exploits this temporal consistency to further refine the set of detected objects $D_v$. The tracking component 315 extracts these objects tracks from each video. For example, the tracking component 315 may perform Kanade-Lucas-Tomasi feature tracking to do so.

After obtaining a set of confident object proposals $D_v$ with the corresponding object proposals $\{b_i\}_{i=1}^{D_v}$, for each object proposal bounding box $b_i$, the tracking component 315 selects a longest track $t_i$ that intersects the object proposal bounding box. The tracking component 315 may then compute relative positions of intersecting object proposals across frames. At each frame, the tracking component 315 selects the proposal having a highest PASCAL overlap with $b_i$ swept across the track. Doing so allows the tracking component 315 to obtain a set of object proposals for each $b_i$, which constitute a track.

In one embodiment, the scoring component 320 measures a confidence score for each object track. To do so, the scoring component 320 evaluates each object proposal. The scoring component 320 accepts tracks (to add to the object detection model 109) if more than half of the object detections on the track have $p(y=c, d=1|x) > v$.

The update component 325 may expand the object detection model 109 as the tool 106 processes additional video data that is not currently accounted for by current object class prototypes. A newly-added prototype satisfies two properties. First, the new prototype should be representative and discriminative for the respective object class. Second, the new prototype should not cause misclassification of samples from other classes. That is, the prototype should be sufficiently far from existing prototypes for other classes. These properties may be represented as:

minimize:

$$\Sigma_{i,c:y_i=c_n,c \neq y_i} \max(\xi_{ic}^1, 0) + \Sigma_{i:y_i \neq c_n} \max(\xi_{ic}^2, 0) + \quad (10)$$

$$\Sigma_j \max(\xi_j^0, 0) + \frac{1}{2}\nu\|u_{c_n}^{K_c+1} - u_0\|^2 + \frac{1}{2}\zeta\|W - W_0\|^2,$$

subject to:

$$S_W^\alpha(x_i, \tilde{U}_{c_n}) + \xi_{ic}^1 \geq S_W^\alpha(x_i, U_c) + 1, c=1c=1 \ldots C, y_i=c_n,$$
$$c \neq c_n \quad (11),$$

$$S_W^\alpha(x_i, U_{y_i}) + \xi_i^2 \geq S_W^\alpha(x_i, \tilde{U}_{c_n}) + 1, y_i \neq c_n \quad (12)$$

$$S_W^\alpha(x_j^0, U_{c_n}) \leq 1 + x_i \quad (13)$$

where W is a newly learned data embedding, $W_0$ is an existing data embedding, $u_0$ is the original prototype for a given object class, and $\tilde{U}_{c_n} = [U_{c_n}, u_{c_n}^{K_c+1}]$. Equation (11) is a sofmax LME constraint between a new object class and existing object classes. Equation (12) is the same constraint between each of the existing categories to the new category embedding. Equation (13) provides detection constraints. Parameters v and $\zeta$ are regularization weights that determine how similar newly learned embeddings are to the original class and data embeddings. If the scoring component 320 accepts a given track, the update component 330 adds samples from the track to the model. Otherwise, if the scoring component 320 rejects the track, then the update component 330 adds the $b_i$ to the model.

Figure 4:
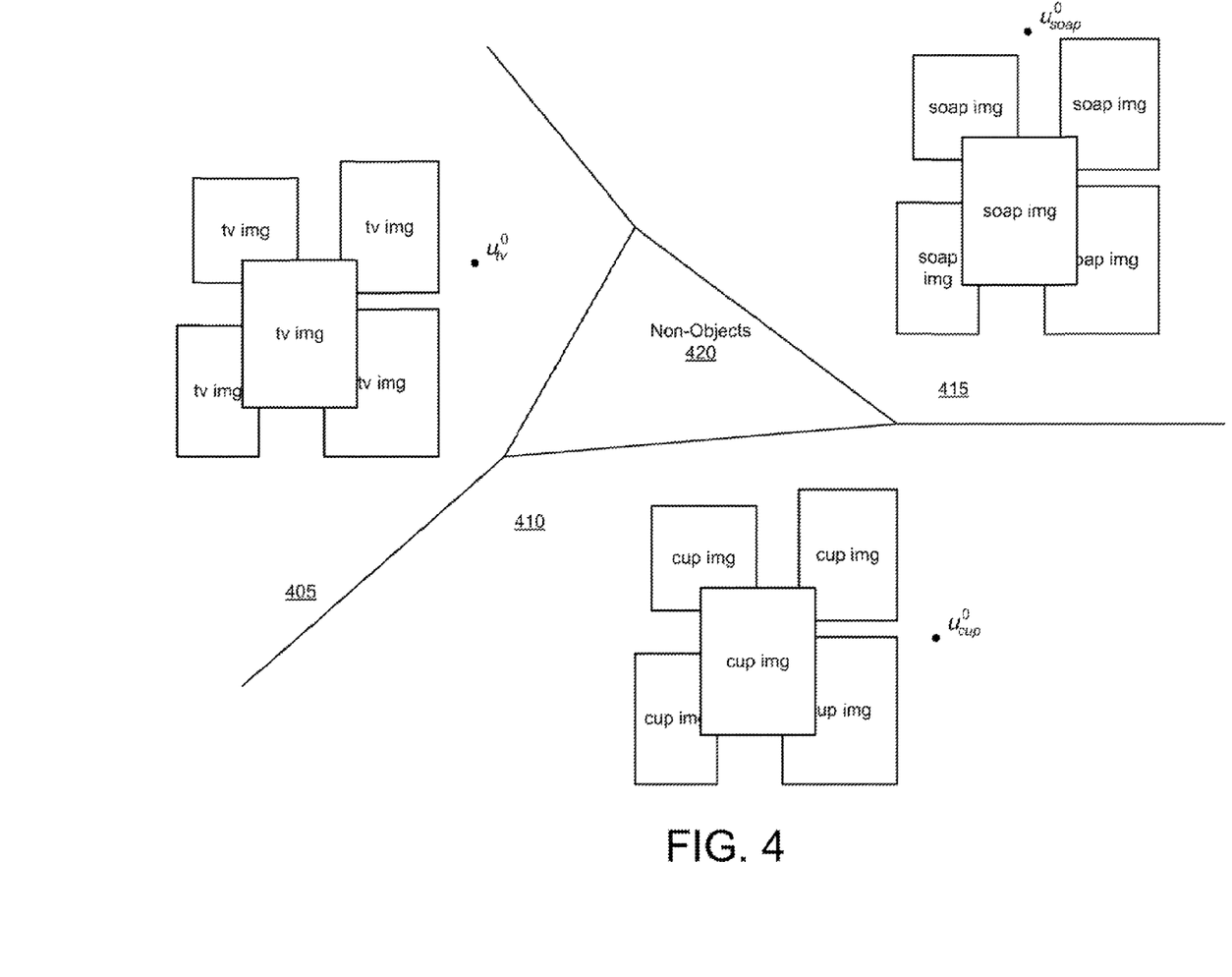
FIG. 4 illustrates an example of an initial object detection model, according to one embodiment.

FIG. 4 illustrates an abstraction of an example object detection model, according to one embodiment. Illustratively, FIG. 4 depicts the model as an object space having three different object classes and a non-object class 420. The object classes include a television class 405, a cup class 410, and a soap class 415. The non-object class 420 represents patches within a video frame that do not contain objects of interest and are sufficiently dissimilar to known object class prototypes.

In one embodiment, each object class is defined to include an initial prototype $u^0$ (labeled in the example object detection model as $u_{tv}^0$, $u_{cup}^0$, and $u_{soap}^0$. Each prototype is learned from one or more labeled static images. The object detection tool 106 detects objects relative to the prototypes of each object class by measuring similarity to the prototypes. Further, the object detection tool 106 may identify objects that reside in the object space but do not overlap with the prototype. In such a case, the object detection tool 106 may add object tracks having a relatively high confidence score as new prototypes to the object detection model.

Figure 5:
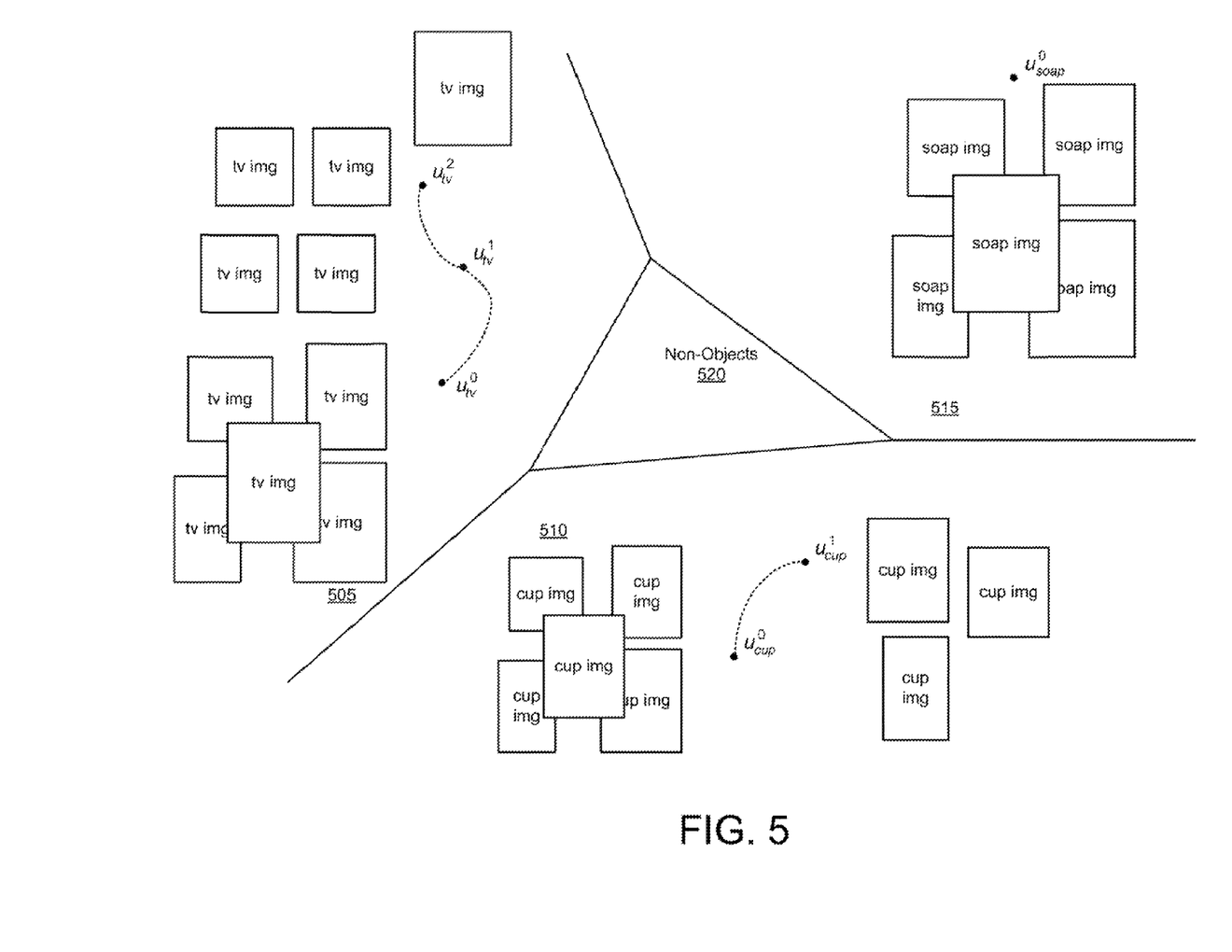
FIG. 5 illustrates an example of an expanded object detection model, according to one embodiment.

FIG. 5 illustrates an abstraction of the object detection model depicted in FIG. 4, according to one embodiment. As the object detection tool 106 detects additional videos, the object detection tool 106 may expand the object detection model 109 such that object classes may include new prototypes. As shown, the model 109 provides an object space including a variety of object classes. The object classes include a television class 505, a cup class 510, and a soap class 515. The object space also includes a non-objects space 520.

Illustratively, the television class 505 includes additional prototypes not included in the abstraction of FIG. 4, represented by $u_{tv}^1$ and $u_{tv}^2$. The object detection tool 106 incrementally expands the object detection model 109 with new data received, e.g., in additional objects or additional videos. For example, assume that the original prototype $u_{tv}^0$ represents a frontal view of a television object. In this case, $u_{tv}^1$ (or subsequent prototypes) can represent other views of a television object, such as a perspective view, side view, rear view, etc. Such prototypes may be obtained while tracking a given object from frame-to-frame (via the tracking component 315).

Figure 6:
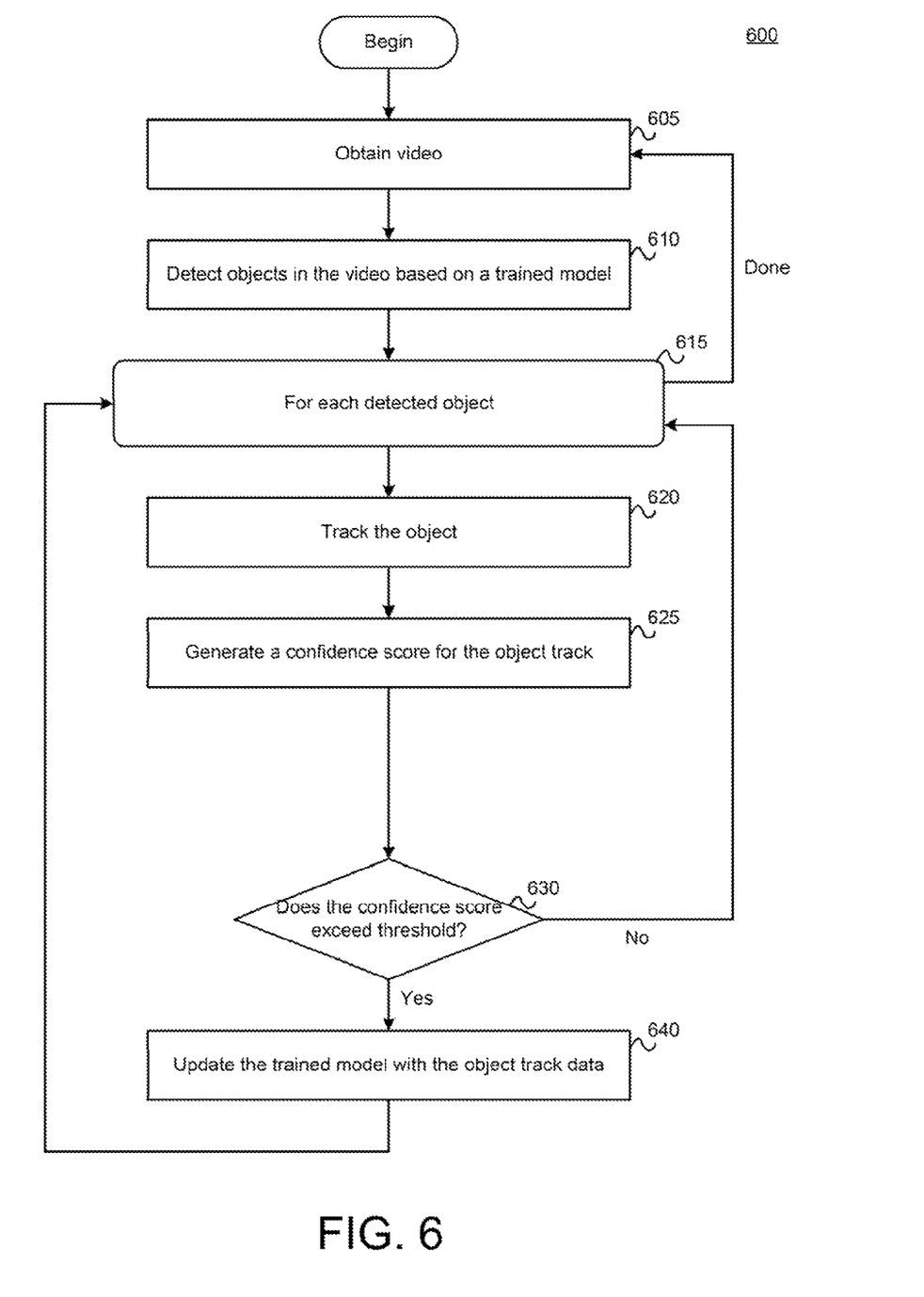
FIG. 6 illustrates a method of incrementally expanding an object detection model, according to one embodiment.

FIG. 6 illustrates a method 600 of incrementally expanding the object detection model 109, according to one embodiment. As shown, method 600 begins at step 605, where the receiving component 305 obtains an unlabeled video file for object detection.

At step 610, the identification component 310 detects objects in the video based on the object detection model 109. As stated, the identification component 310 obtains object proposals (i.e., potential objects) from the video. To do so, the identification component 310 may use selective search techniques and associated feature vectors. Particularly, the identification component 310 evaluates each feature vector to obtain a probability score for each proposal. The identification component 310 obtains a set of detected objects from the object proposals having a probability score that exceed a given threshold.

At step 615, the method 600 enters a loop for each detected object. The loop includes steps 620 to 640. At step 620, the tracking component 315 obtains a track of the object across frames of the video. The tracking component 315 may use feature tracking, such as Kanade-Lucas-Tomasi techniques to do so. For example, the tracking component 315 may continuously observe a given object as the frames shift focus and perspective of the object (e.g., frontal view, side view, etc.).

At step 625, the scoring component 325 generates a confidence score of the object track. The confidence score indicates a likelihood that the object in the track corresponds to a new object prototype for a given object space. At step 635, the scoring component 330 determines whether the confidence score associated with the object track exceeds a threshold. If so, then the scoring component 330 accepts the object track to be added to the object detection model 109.

At step 640, the update component 335 expands the object detection model 109 by adding the object track to the object detection model 109. More particularly, the update component 640 adds the object track as a new prototype to a corresponding object class. However, if the object track score does not exceed a threshold, then the update component 330 may simply add the corresponding bounding box for the object to the object detection model 109. The method 600 returns to step 615, until the object detection tool 106 has finished processing each object in the video.

As stated, the object detection tool 106 may continuously update the object detection model 109 with data corresponding to new object class prototypes as the object detection tool 106 processes additional videos. After the object detection tool 106 completes evaluating each object in a given video, the method 600 returns to step 605. Doing so results in the object detection tool 106 expanding the object detection model 109, where the number of prototypes per object class is mitigated by variance of object instances within each object class.

In the preceding, reference is made to embodiments of the present disclosure. However, it should be understood that the present disclosure is not limited to specific described embodiments. Instead, any combination of the following features and elements, whether related to different embodiments or not, is contemplated to implement and practice the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the present disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments presented herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

For example, the object detection system may be a virtual computing instance executing in the cloud, and the object detection tool may execute on the virtual computing instance. The object detection tool may maintain and expand the object detection model in cloud storage. For example, the object detection tool may identify new object class prototypes for a given object space and add the prototypes to the object detection model stored in the cloud.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A method, comprising:
identifying, based on an object detection model, one or more objects in a first sequence of video frames of a plurality of sequences of video frames, wherein the object detection model provides an object space including a plurality of object classes, wherein each object is classified as being an instance of one of the classes, and wherein each object class includes one or more prototypes representing an instance of an object associated with the object class; and
for each identified object:
tracking the object across at least one of the frames, generating a measure of confidence for the object based on the tracking, wherein the measure of confidence indicates a degree that the object does not correspond to any of the one or more prototypes currently associated with the object class, and upon determining that the measure of confidence exceeds a threshold, adding a prototype representative of the instance to the object detection model.

2. The method of claim 1, further comprising, upon determining that the measure of confidence does not exceed the threshold:
identifying one of the prototypes that the object corresponds to; and
reinforcing the identified object.

3. The method of claim 1, further comprising:
for each successive sequence of video frames in the plurality of sequences, updating the object detection model based on one or more objects in the sequence of video frames identified based on the object detection model.

4. The method of claim 1, wherein the object detection model is a large margin embedding (LME)-based model.

5. The method of claim 1, wherein tracking the object across the frames comprises performing Kanade-Lucas-Tomasi feature tracking on the object.

6. The method of claim 1, wherein identifying the one or more objects in the first sequence of video frames comprises:
identifying at least a first object proposal;
determining a probability score for the first object proposal based on a selective search and feature vectors corresponding to the first object proposal; and
upon determining that the first object proposal has a probability score exceeding a second threshold, adding the first object proposal to a set of detected objects.

7. The method of claim 1, further comprising:
initializing the object detection model with a plurality of labeled images.

8. A non-transitory computer-readable storage medium having instructions, which, when executed on a processor, perform an operation comprising:
identifying, based on an object detection model, one or more objects in a first sequence of video frames of a plurality of sequences of video frames, wherein the object detection model provides an object space including a plurality of object classes, wherein each object is classified as being an instance of one of the object classes, and wherein each object class includes one or more prototypes representing an instance of an object associated with the object class; and
for each identified object:
tracking the object across at least one of the frames,
generating a measure of confidence for the object based on the tracking, wherein the measure of confidence indicates a degree that the object does not correspond to any of the one or more prototypes currently associated with the object class, and
upon determining that the measure of confidence exceeds a threshold, adding a prototype representative of the instance to the object detection model.

9. The computer-readable storage medium of claim 8, wherein the operation further comprises, upon determining that the measure of confidence does not exceed the threshold:
identifying one of the prototypes that the object corresponds to; and
reinforcing the identified object.

10. The computer-readable storage medium of claim 8, wherein the operation further comprises:
for each successive sequence of video frames in the plurality of sequences, updating the object detection model based on one or more objects in the sequence of video frames identified based on the object detection model.

11. The computer-readable storage medium of claim 8, wherein the object detection model is a large margin embedding (LME)-based model.

12. The computer-readable storage medium of claim 8, wherein tracking the object across the frames comprises performing Kanade-Lucas-Tomasi feature tracking on the object.

13. The computer-readable storage medium of claim 8, wherein identifying the one or more objects in the first sequence of video frames comprises:
identifying at least a first object proposal;
determining a probability score for the first object proposal based on a selective search and feature vectors corresponding to the first object proposal; and
upon determining that the first object proposal has a probability score exceeding a second threshold, adding the first object proposal to a set of detected objects.

14. The computer-readable storage medium of claim 8, wherein the operation further comprises:
initializing the object detection model with a plurality of labeled images.

15. A system, comprising:
a processor; and
a memory storing program code, which, when executed on the processor, performs an operation comprising:
identifying, based on an object detection model, one or more objects in a first sequence of video frames of a plurality of sequences of video frames, wherein the object detection model provides an object space including a plurality of object classes, wherein each object is classified as being an instance of one of the object classes, and wherein each object class includes one or more prototypes representing an instance of an object associated with the object class, and
for each identified object:
tracking the object across at least one of the frames,
generating a measure of confidence for the object based on the tracking, wherein the measure of confidence indicates a degree that the object does not correspond to any of the one or more prototypes currently associated with the object class, and
upon determining that the measure of confidence exceeds a threshold, adding a prototype representative of the instance to the object detection model.

16. The system of claim 15, wherein the operation further comprises, upon determining that the measure of confidence does not exceed the threshold:
identifying one of the prototypes that the object corresponds to; and
reinforcing the identified object.

17. The system of claim 15, wherein the operation further comprises:
for each successive sequence of video frames in the plurality of sequences, updating the object detection model based on one or more objects in the sequence of video frames identified based on the object detection model.

18. The system of claim 15, wherein the object detection model is a large margin embedding (LME)-based model.

19. The system of claim 15, wherein identifying the one or more objects in the first sequence of video frames comprises:
- identifying at least a first object proposal;
- determining a probability score for the first object proposal based on a selective search and feature vectors corresponding to the first object proposal; and
- upon determining that the first object proposal has a probability score exceeding a second threshold, adding the first object proposal to a set of detected objects.

20. The system of claim 15, wherein the operation further comprises:
- initializing the object detection model with a plurality of labeled images.

* * * * *

UNITED STATES PATENT AND TRADEMARK OFFICE
CERTIFICATE OF CORRECTION

PATENT NO. : 9,805,264 B2  Page 1 of 1
APPLICATION NO. : 14/887141
DATED : October 31, 2017
INVENTOR(S) : Alina Kuznetsova et al.

It is certified that error appears in the above-identified patent and that said Letters Patent is hereby corrected as shown below:

On the Title Page

On the page 2, in Column 1, item (56) under "Other Publications", Line 1, delete "Categeory" and insert -- Category --, therefor.

On the page 2, in Column 1, item (56) under "Other Publications", Line 56, delete "Patteron" and insert -- Pattern --, therefor.

On the page 2, in Column 2, item (56) under "Other Publications", Line 66, delete ""Ubiased" and insert -- "Unbiased --, therefor.

In the Specification

In Column 6, Line 35, delete "+1,c=1c=1" and insert -- +1,c=1 --, therefor.

In the Claims

In Column 10, Line 57, in Claim 1, after "one of the" insert -- object --.

Signed and Sealed this
Sixth Day of March, 2018

Andrei Iancu
*Director of the United States Patent and Trademark Office*